Nov. 15, 1960 M. L. STEVENS ET AL 2,960,202
CLUTCH MECHANISM FOR A HELICOPTER
Filed May 25, 1955 3 Sheets-Sheet 3
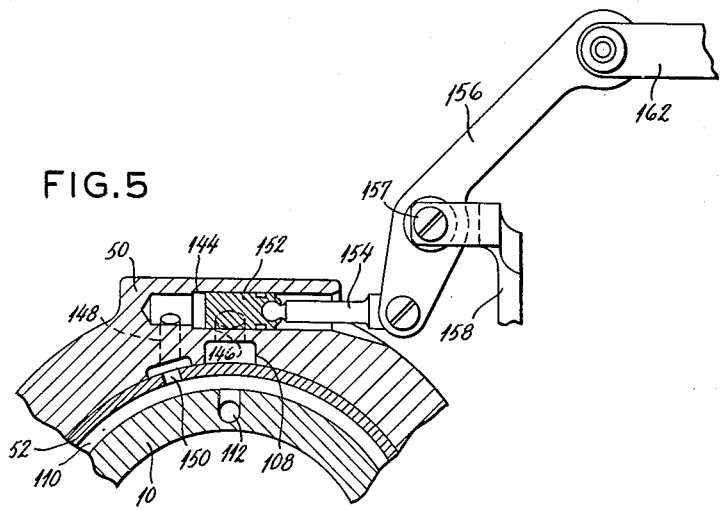
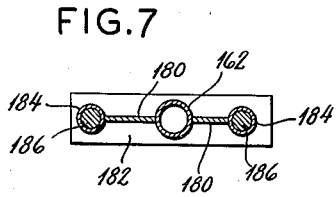
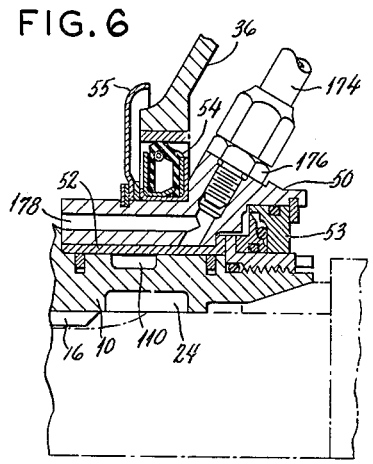
INVENTORS
MARTIN L. STEVENS
NELSON R. RICHMOND
BY S. Jay Teller
ATTORNEY

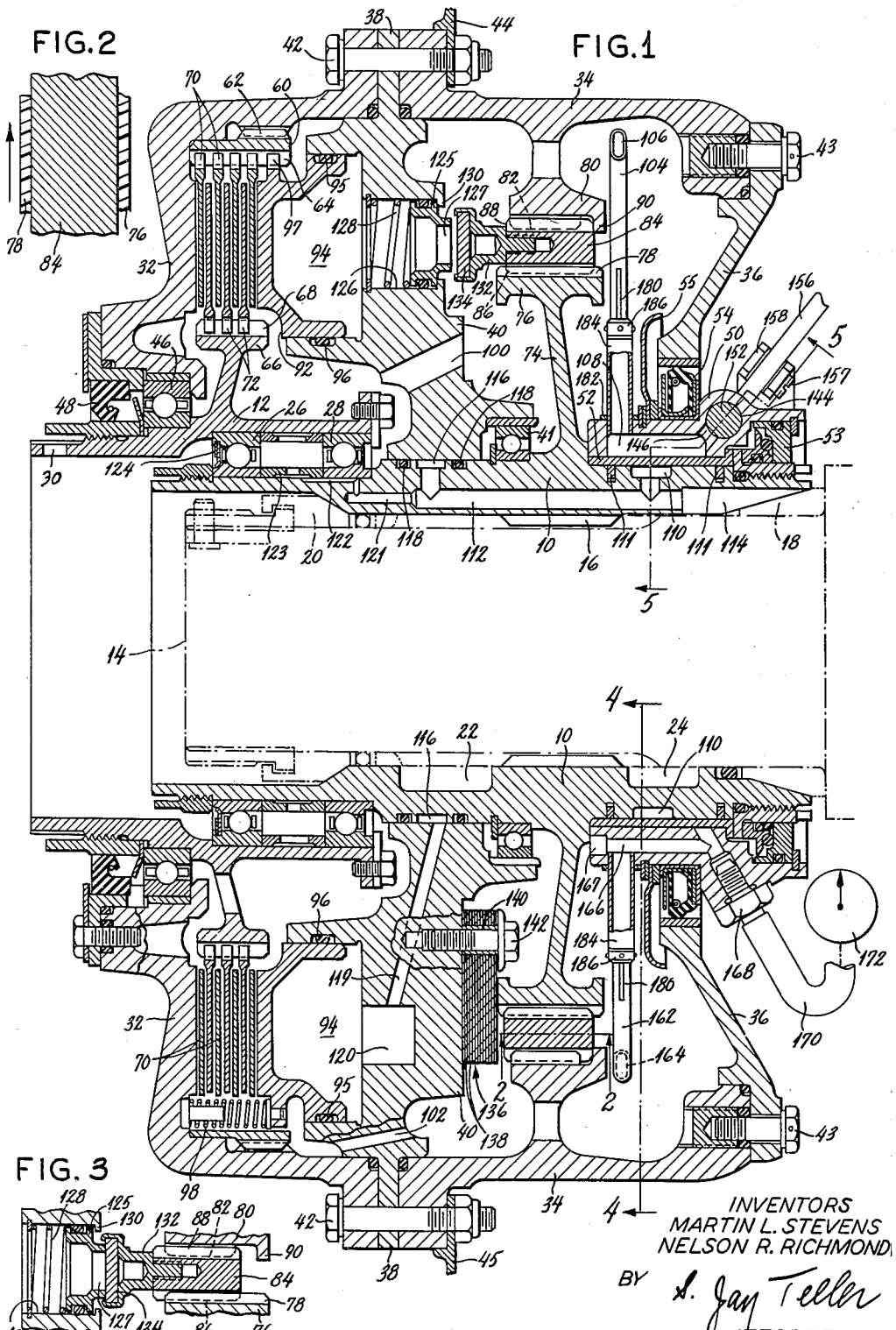

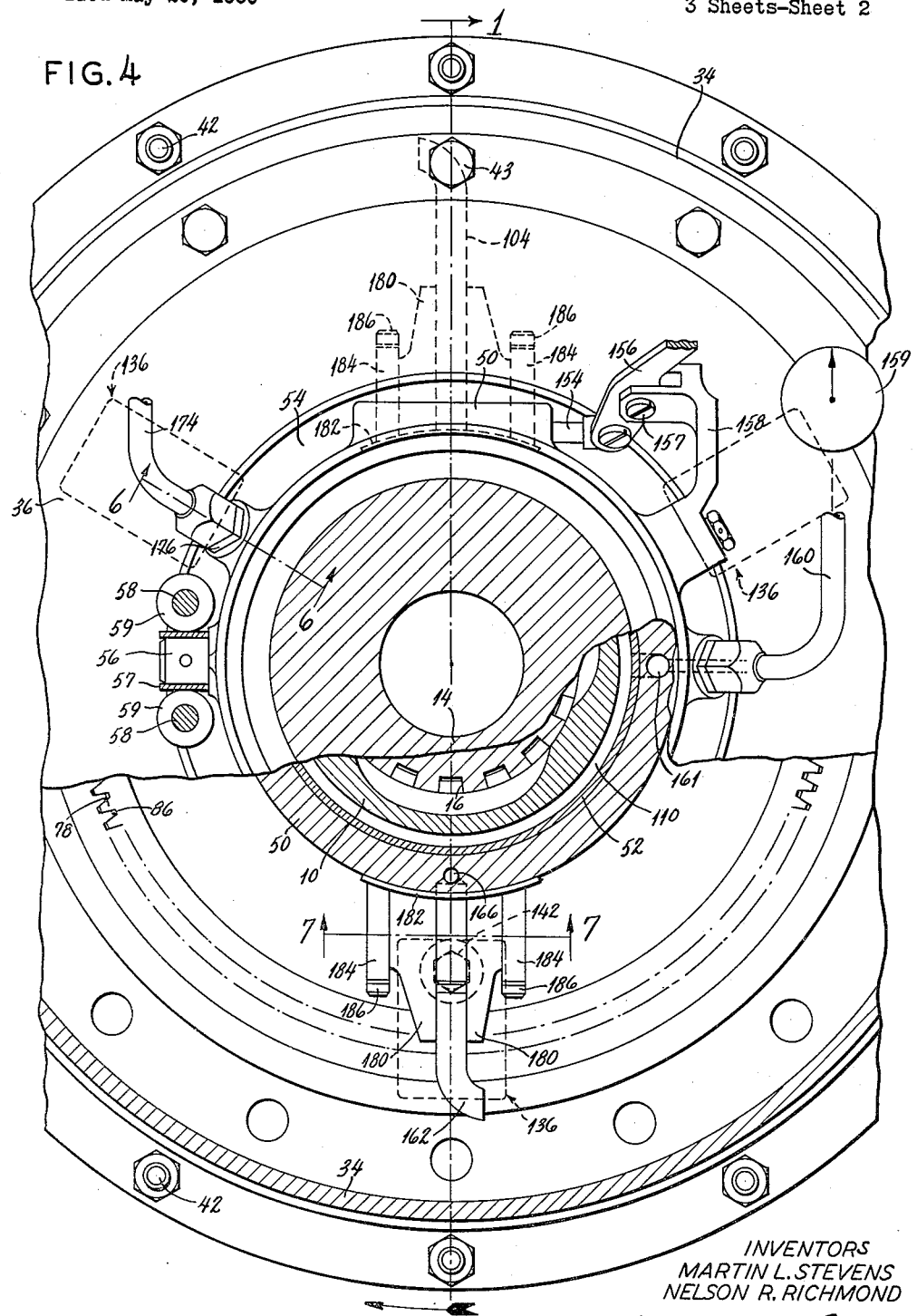

United States Patent Office 2,960,202
Patented Nov. 15, 1960

2,960,202
CLUTCH MECHANISM FOR A HELICOPTER

Martin L. Stevens, West Hartford, and Nelson R. Richmond, Thompsonville, Conn., assignors to The Kaman Aircraft Corporation, Bloomfield, Conn., a corporation of Connecticut Filed May 25, 1955, Ser. No. 510,968

10 Claims. (Cl. 192—85)

The present invention relates to a clutch mechanism for a helicopter, and more particularly to a clutch mechanism of the type shown in the copending application of Nelson R. Richmond, Serial No. 379,108, filed September 9, 1953, entitled "Clutch Mechanism for a Helicopter."

In a helicopter having a clutch mechanism of the said type, the clutch mechanism is interposed between the motor of the helicopter and the rotor or rotors thereof. The motor is normally operable and the clutch mechanism includes a normally rotating driving member directly connected with the motor. The rotor is normally rotatable in a selected direction by power transmitted thereto and it is capable of autorotation in the same direction by aerodynamic forces. The clutch mechanism includes a member connected with the rotor for rotation in synchronism therewith under all conditions. The clutch mechanism also includes a rotatable intermediate member together with means for transmitting power thereto from the driving member. The clutch mechanism further includes a clutch interposed between the intermediate member and the rotor connected or driven member, the said clutch serving to establish or break a power connection between the intermediate member and the rotor connected or driven member.

During power-on flight power is transmitted from the motor to the rotor through the said driving member, through the first said power transmitting means, through the said intermediate member, through the said clutch and through the said rotor connected or driven member, the operation of the clutch being dependent upon the transmission of power by the said power transmitting means.

Upon failure of the motor or upon substantial reduction in the speed thereof, the rotor rotates aerodynamically and serves to rotate the said rotor connected member. The characeristics of the clutch mechanism are such that rotation of the last said member at a speed greater than that corresponding to the motor speed causes the interruption of the power connection through the clutch, thus leaving the rotor free for autorotation entirely independently of the motor and of all parts directly associated therewith.

The general object of the present invention is to provide a clutch mechanism utilizing many of the principles of the clutch mechanism disclosed in said application but considerably simplified in construction and having certain novel and advantageous features.

The drawings show in detail a presently preferred embodiment of the invention, but it will be understood that various changes may be made from the construction shown, and that the drawings are not to be construed as defining or limiting the scope of the invention, the claims forming a part of this specification being relied upon for that purpose.

Of the drawings:

Fig. 1 is a vertical longitudinal sectional view showing a clutch mechanism embodying the invention, this view being taken along the line 1—1 of Fig. 4.

Fig. 2 is a fragmentary sectional view taken along the line 2—2 of Fig. 1.

Fig. 3 is a fragmentary view similar to a portion of Fig. 1, but showing the exhaust valve parts in different relative positions.

Fig. 4 is a combined right elevational and vertical sectional view, the sectional portion of the view being taken along the line 4—4 of Fig. 1.

Fig. 5 is a fragmentary sectional view taken along the line 5—5 of Fig. 1.

Fig. 6 is a fragmentary sectional view taken along the line 6—6 of Fig. 4.

Fig. 7 is a fragmentary horizontal sectional view taken along the line 7—7 of Fig. 4.

Most of the parts of the clutch mechanism are rotatable about a central longitudinal axis and they therefore assume various rotative positions. For clarity of illustration one rotative position has been arbitrarily selected for illustration.

Driving and driven members

Referring to the drawings and more particularly to Figs. 1 and 4, the clutch mechanism comprises a rotatable driving member 10, and a rotatable member 12 which is normally the driven member and which is rotatable about the same axis as the driving member. When the clutch mechanism is used in or as a part of a helicopter, the driving member 10 is connected with the shaft 14 of the helicopter engine or motor, not shown. The driven member 12 is connected with a rotatable member, not shown, which is operatively connected by suitable power transmitting means with the rotor or rotors of the helicopter. The connection between the member 12 and the rotor or rotors of the helicopter is such that the said member and the said rotor or rotors rotate in synchronism under all conditions.

As shown, the driving member 10 is a sleeve surrounding the motor shaft 14 and is connected for rotation in unison therewith by suitable means such as internal integral teeth at 16 fitting corresponding splines in the shaft. The sleeve 10 is centered with respect to the shaft 14 by beveled rings 18 and 20 which are suitably connected to said shaft. For reduction of weight the member 10 has annular recesses 22 and 24 at opposite ends of the teeth 16. The driven member 12 is at least partly supported on the driving member or sleeve 10 for rotation relative thereto, ball or other antifriction bearings 26 and 28 being interposed between the two members. The member 12 has suitable means, shown as holes 30, for connecting said member 12 with the before-mentioned rotatable member which is connected with the rotor or rotors of the helicopter.

Intermediate member and oil transfer member

The clutch mechanism includes a rotatable member intermediate the driving and driven members and rotatable about the same axis. The intermediate member includes a rotatable housing which encloses various other parts, the said housing being normally driven by the driving member 10 but not necessarily in exact synchronism therewith. The housing as shown comprises three structurally separate parts or members 32, 34 and 36 which are rigidly connected with each other. Interposed between the members 32 and 34 is an annular flange 38 forming a part of a member 40 having a central opening which receives and fits the central portion of the driving member 10. A ball or other antifriction bearing 41 is interposed between said members 10 and 40. Bolts 42, 42 extend through flanges on the members 32 and 34 and through the said flange 38. The member 36 is directly connected with the member 34 by bolts 43, 43. From the foregoing description it will be apparent that the several parts 32, 34, 36 and 40 are all rigidly connected with each other for rotation in unison. These several parts collectively constitute the "intermediate member."

Preferably a suitable fan for motor cooling is carried by the rotatable main housing. The details of the fan do not constitute any part of the present invention, but Fig. 1 shows parts of the fan at 44 and 45, these parts being held respectively by the bolts 42, 42 and 43, 43. For clarity the fan parts are omitted from Fig. 4.

The member 32 of the rotatable housing is supported on the driven member 12, the said member 12 and the said housing being rotatable independently of each other. A ball or other anti-friction bearing 46 is interposed between the member 32 and the member 12, and an annular sealing means 48 is interposed between the member 32 and the member 12 to prevent the escape of oil.

Surrounding the right end portion of the driving member 10 is an oil transfer member 50 which is supported by the said driving member and which is nonrotatable. A bearing bushing 52 is interposed between the member 50 and the member 10 which bushing is connected with the member 50 and is nonrotatable. An annular sealing means 53 is interposed between the members 50 and 10 and another annular sealing means 54 in interposed between the member 36 and the member 50, each of the said sealing means serving to prevent the escape of oil. Preferably the member 50 carries an annular baffle 55 which tends to keep oil away from the sealing means 54.

For preventing rotation of the oil transfer member 50, the said member has an integral lug 56 which extends radially therefrom, this lug being shown in Fig. 4 as projecting horizontally. To minimize wear, the lug 56 has a hardened steel bushing 57 thereon. Two stationary pins 58, 58 project rearwardly from the motor frame, not shown, and these pins carry rollers 59, 59 formed of rubber or a suitable rubber substitute. The pins 58, 58 are so positioned that the rollers 59, 59 engage the bushing 57 at the opposite sides thereof so as to prevent any rotative movement of the member 50 or of the parts carried thereby. Although the member 50 cannot rotate it is free for minor vibratory movements relative to the motor frame.

*Clutch between intermediate and driven members*

Means is provided for transmitting power from the intermediate member to the normally driven member 12. Preferably the said power transmitting means is a clutch which is shown as being of the multiple plate friction type.

As shown, there is a ring 60 within the housing member 32 and connected therewith by means of interengaging integral teeth at 62 on the said ring and on the said housing member. The ring 60 has longitudinal internal grooves at 64. The member 12 has an integral annular flange 66 having longitudinal external grooves at 68. Interengaging annular friction clutch plates 70, 70 and 72, 72 are provided. The plates 70, 70 have outwardly projecting teeth which extend into the internal grooves 64 in the ring 60 and the plates 72, 72 are alternately disposed with respect to the plates 70, 70 and have inwardly projecting teeth which extend into the external groves 68 in the annular flange 66 of the member 12. When longitudinal pressure is applied to the plates 70, 70 and 72, 72, in the manner hereinafter described, the said plates serve frictionally to transmit power from the main housing or intermediate member to the driven member 12. When no pressure is applied, the clutch plates are slightly separated so that no power is transmitted. For clarity of illustration the spacings between the clutch plates are considerably exaggerated in Fig. 1. The clutch is operable to establish and break a power connection between the intermediate member and the normally driven member, the power connection being established and broken by the application of pressure or by the release of pressure.

*Power transmitting means between driving and intermediate members*

The driving member 10 is provided with a generally radial annular flange 74 located between the member 40 and the nonrotary oil transfer member 50, and said flange 74 has a longitudinal annular flange 76 at its periphery. Formed on the flange 76 are external helical teeth 78 having angles with respect to longitudinal lines that are preferably substantially less than 45°. As shown in Fig. 2, said angles are approximately 23° but the angles are not critical. Formed integrally with the housing member 34 is a longitudinal annular flange 80 which surrounds the annular flange 76. The said flange 80 has internal longitudinal teeth 82. A longitudinally movable torque ring 84 is provided which is located in part between the said longitudinal annular flanges 76 and 80. The said ring is formed with internal helical teeth 86 which mesh with the external helical teeth 78 on the flange 76 and is formed with external longitudinal teeth 88 which mesh with the internal longitudinal teeth 82 on the flange 80.

It will be observed that when the driving member 10 is rotated in the clockwise direction, as indicated in Fig. 4, the intermeshing helical teeth 78 and 86 tend to move the torque ring 84 toward the left from the position shown in Fig. 1 to the position shown in Fig. 3, such movement resulting from the fact that the intermediatae member and the flange 80 thereon are stationary or rotating only slowly. An angle of less than 45° is desirable for the teeth 78 and 86 in order to avoid an unnecessarily large force component acting to move the torque ring toward the left. In order for the torque ring 84 to be moved toward the left as stated, there must be some resistance to the rotation of the intermediate member. In the construction shown, such resistance is provided by the inertia of the intermediate member which may be supplemented by the fan 44, 45 that is connected with and driven by the intermediate member.

The said torque ring 84 constitutes a clutch engaging member as hereinafter explained, and the clutch is engaged when the said ring is moved toward the left. When movement of the ring 84 toward the left is resisted or stopped, said ring is rotated with the flange 74. When this occurs, the intermeshing longitudinal teeth 82 and 88 transmit power from the driving member through the ring 84 to rotate the flange 80 and the entire intermediate member. When the intermediate member is rotated as last above stated, power is ordinarily transmitted therefrom through the friction clutch to rotate the driven member 12, the said clutch having been engaged by reason of the movement of the torque ring 84 toward the left. However, when the intermediatae member is rotated at a speed greater than that of the member 10, as for instance upon autorotation of the helicopter rotor or rotors, the action on the torque ring 84 is reversed and the ring moves toward the right from the Fig. 3 position to the Fig. 1 position, the clutch being then disengaged. An annular stop 90 on the annular flange 80 serves to limit movement of the torque ring 84 toward the right.

Reference has been made to relative rotation between the driving and intermediate members. Actually the relative rotation is very small and is merely that necessary to move the torque ring from the Fig. 1 position to the Fig. 3 position or vice versa. The before-mentioned ball bearing 41 facilitates this small relative movement.

*Hydraulic system for controlling clutch*

A hydraulic system is provided for applying pressure to the plates 70, 70 and 72, 72 of said clutch between the intermediate and driven member. This hydraulic system includes a rotary hydraulic means on the intermediate member. Preferably the last said means comprises a rotary longitudinally movable piston 92 which is preferably annular and fits an annular recess in the member 40. The said annular recess is open at the end adjacent the clutch and the said piston 92 is positioned to apply pressure for engaging the clutch. A normally closed annular chamber 94 is provided which is partly within the piston 92 and partly within the said recess in the member 40. The chamber 94 and other parts of the hydraulic system are normally filled with a suitable hydraulic liquid which is preferably oil. Sealing rings 95 and 96 prevent escape of oil from the chamber 94. Oil of lubricating quality is preferred, and the oil also serves as a lubricant for the several bearings.

The piston 92 preferably has teeth 97 which engage the ring 60, these teeth insuring rotative movement of the piston in exact unison with the housing and with the entire intermediate member. Springs 98 are provided for biasing the piston 92 toward the right and away from the clutch plates, these springs being interposed between the said piston and the housing member 32. Only one spring 98 is shown but it will be understood that there is a plurality of springs preferably uniformly spaced circumaxially.

The space within the housing and surrounding the member 10 constitutes an oil reservoir adapted to contain a supply of the oil or other hydraulic liquid, the oil being retained by the several annular seals that have been described. It will be understood that the space within the housing reservoir is not necessarily entirely filled with oil. Holes 100 and 102 provide for the free flow of oil from one side of the member 40 to the other side thereof. As hereinafter described in detail, means are provided for normally maintaining a supply of oil in the annular chamber 94 so that the said chamber is completely filled. The oil so supplied is withdrawn from the said reservoir in the housing.

When the clutch mechanism parts are rotating, centrifugal force causes all free oil in the housing reservoir to move into an annular layer adjacent the housing periphery, the said layer moving in the clockwise direction with the housing. The oil in the said layer is under pressure as the result of the centrifugal action, but such pressure is equalized and does not tend to relatively move any of the clutch parts. When mention is herein made to net pressure, this is intended to refer to pressure additional to the said equalized pressure.

A stationary or nonrotatable scoop tube 104 is carried by the nonrotatable member 50 and extends generally radially therefrom. As shown the tube 104 extends upwardly, but this is not essential. The scoop tube at its outer or upper end preferably has an intake opening 106 which faces in the direction to receive oil from the moving annular layer. As the result of its velocity, the oil entering or impinging upon the tube has a considerable impact pressure which is additional to the pressure due merely to centrifugal action. The total oil pressure in the tube is the combination of the said centrifugal pressure and the said impact pressure. The oil under pressure which enters the tube 104 is conducted through a series of intercommunicating pressure retaining ducts which are normally unobstructed and which extend continuously from the inner end of said intake tube to said rotary piston chamber 94 so that oil may flow continuously and without interruption from said tube to said chamber. The several ducts in said series are enclosed and are pressure retaining, the result being that there is no loss in oil pressure between the tube 104 and the piston chamber 94. In said piston chamber 94 the oil tends to move the piston 92 toward the left and to thus move the clutch plates toward the left and into frictional power transmitting engagement with each other.

As shown, the inner or lower end of the tube 104 communicates with a longitudinal groove or chamber 108 in the member 50. The bushing 52 completely closes the chamber 108 at the inner side thereof. The chamber 108 communicates indirectly through a valve, as hereinafter explained, with an annular groove 110 in the periphery of the driving member 10. Sealing rings 111, 111 prevent the escape of oil longitudinally from the annular groove 110. The groove 110 communicates with a longitudinal hole 112 in the said driving member 10, the hole being closed at its right end by a plug 114. The oil hole 112 communicates near its left end with an annular groove 116 in the periphery of the driving member 10. Sealing rings 118, 118 prevent the escape of oil longitudinally from the annular groove 116. The member 40 has an approximately radial hole 119, the inner end of which is always in communication with the groove 116. The hole 119 constitutes an unobstructed supply duct and its inner end is at approximately the same radius as the inner end of the intake tube 104. The outer end of the hole 119 communicates with a recess 120 in the chamber 94. Thus oil under pressure is or may be continually and uninterruptedly supplied from the tube 104 to the piston chamber 94 through various ducts which include the groove 108, the groove 110, the hole 112, the groove 116, the hole 119 and the recess 120.

When the clutch is once engaged, there is no further relative movement of the piston 92 and there is little or no actual flow of oil into the chamber 94. However, pressure is maintained in said chamber and in the ducts leading thereto. The net pressure in the chamber 94 is considerably greater than the aforesaid combined pressure in the tube 104. If the chamber 94 and the hole or duct 119 were filled with oil and if the inner end of said hole or duct were blocked, there would be substantial net pressure in the chamber resulting from the centrifugal action of the column of oil in said duct 119. Actually, however, the inner end of the duct 119 is not blocked and additional pressure is applied thereto which is about equal to the aforesaid combined pressure in the tube 104. Therefore the actual total net pressure in the chamber 94 is the sum of the said pressure due to the centrifugal action of the oil in the duct 119 and the pressure applied to the inner end of said duct from the tube 104, the last said pressure being the combination of the centrifugal and impact pressures at the outer end of the tube.

Preferably a hole 121 in the driving member 10 communicates with the hole 112 for supplying oil to lubricate the bearings 26 and 28. The hole 121 communicates with a groove 122 in said member 10 which groove connects with an annular groove in a spacer 123 between the bearings. A seal 124 prevents the escape of oil at the left, and the hole 121 and the groove 122 provide a continuous flow of oil to the bearings whenever the valve is open to supply oil to the piston chamber 94. Excess oil flows out at the right and returns to the main reservoir.

*Control of clutch by power transmitting means*

In order that the operation of the clutch may be controlled by the torque ring 84, there is provided a valve member 125 which is longitudinally movable in a cylindrical opening or discharge outlet 126 in the member 40, the opening communicating at the left with the piston chamber 94. The supply duct 119 and the discharge outlet 126 are entirely separate from each other. The valve member 125 has a relatively large central opening or outlet 127 therein. A spring 128 biases the valve member toward the right, and an annular stop 130 limits said movement toward the right, as shown in Fig. 1. Carried by the torque ring 84 is a stem 132 which extends toward the right and which carries a valve closure 134. The valve closure 134 is adapted to close the opening or outlet 127 in the valve member 125. The closure 134 is positively connected with the ring 84 for movement in unison therewith in both directions.

When power is not being transmitted from the drive member to the intermediate member and more particularly when the intermediate member tends to rotate faster than the drive member, the torque ring is in its extreme position toward the right, as shown in Fig. 1, and the closure 134 is disengaged from the valve member 125, the said member having been moved by the spring 128 to its extreme position toward the right as determined by the stop 130. With the parts in this relative position, oil can flow freely toward the right through the discharge outlet 127 in the valve member 125. This free flow of oil prevents the building up or maintenance of pressure in the chamber 94 and the clutch cannot be engaged or maintained in engagement. The springs 98 have moved the piston toward the right and oil pressure between the plates has separated them in the conventional manner.

When power is being transmitted from the driving member to the intermediate member, the torque ring 84 is moved to its extreme position toward the left, as shown in Fig. 3, and the closure 134 is engaged with the valve member 125 which is moved slightly toward the left in opposition to the spring 128. The discharge outlet 127 in the valve member is closed. With the parts in this relative position oil cannot escape from the chamber 94 and the oil supplied under pressure to the said chamber from the intake tube 104 serves to move the piston 92 toward the left in opposition to the springs 98. Such movement of the piston engages the clutch so as to transmit power from the intermediate member to the driven member. From the foregoing description it will be apparent that the closure 134 constitutes a rotary device having a closed position as shown in Fig. 3 for causing oil pressure to be maintained in the rotary hydraulic means so that the clutch is engaged and having an open position as shown in Fig. 1 for preventing oil pressure within the rotary hydraulic means so that the clutch is released.

The torque ring 84 may sometimes be moved suddenly and rapidly from the Fig. 1 position to the Fig. 3 position, as for instance when there is a change from autorotation to power-on flight. In order to absorb the shock incident to stopping the ring 84 in the Fig. 3 position, shock absorbers 136 are preferably provided on the member 40. There are preferably three equally spaced shock absorbers, but the number may be changed.

Each shock absorber 136 comprises a plurality of thin similar plates 138 apertured to fit a bushing 140 held by a bolt 142. The length of the bushing 140 is slightly greater than the aggregate thickness of the plates 138 with the result that the plates are normally slightly spaced with oil films between them. When the plates are struck by the ring 84 upon sudden movement thereof toward the left, oil is squeezed from between the plates and the plates slightly yield to absorb the shock.

*Valve for controlling flow of oil*

It has been stated that the chamber 108 in the member 50 communicates through a valve with the annular groove 110 in the periphery of the driving member 10. This valve is shown in Figs. 1, 4 and 5.

A transverse horizontal opening 144 is provided in an enlargement of the oil transfer member 50, this opening preferably being at the front of the chamber 108. A first hole or duct 146 connects the chamber 108 with the opening 144. A second duct 148 in the member 50 and an aligned hole 150 in the bushing 52 connect the opening 144 with the annular groove 110 in the driving member 10, the said duct 148 and hole 150 being spaced from the hole or duct 146 in the transverse direction.

A valve piston 152 fits the opening 144 and is movable lengthwise thereof. As shown in Figs. 1 and 5, the piston completely blocks the hole 146 and prevents any flow of oil from the scoop tube 104 to the piston chamber 94. A suitable mechanism is provided for moving the piston 152 and as shown the mechanism includes a link 154 connected at one end with the piston and at the other end with a bell crank 156 pivoted at 157 on a bracket 158 secured to the oil transfer member 50. The bell crank may be turned by a link 162 which is manually movable by suitable means not shown.

With the piston 152 in the position shown in Figs. 1 and 5 the hole or duct 146 is blocked and no oil can flow to the chamber 94 of the hydraulic means and the clutch is disengaged as shown in Fig. 1. However, when the piston 152 is moved toward the right, as viewed in Fig. 5, the hole or duct 146 freely communicates with the tube 104 and there is a continuous series of connected but entirely unobstructed ducts extending from the scoop tube 104 to the piston chamber 94. Thus pressure is established in the chamber 94 as previously described and the clutch is engaged.

For enabling the pilot to observe the pressure of the oil in the ducts leading to the hydraulic means for applying pressure to the clutch, there is preferably provided a pressure gage 159 connected by a pipe 160 with a nipple on the oil transfer member 50 as shown in Fig. 4. The pressure gage 159 is shown only schematically. The said nipple is connected with a longitudinal hole 161 in said member which is blocked at its inner end and which communicates with said annular groove 110 in the driving member 10.

The valve and its operating mechanism constitute manually operable means for permitting or preventing the flow of oil and for thus engaging or releasing the clutch. With the valve 152 closed as shown in Fig. 5, the clutch cannot be engaged even though the torque ring 84 has been moved to its left position as shown in Fig. 3. However, when the torque ring 84 is in its said left position and the valve 152 is open, oil under pressure flows to the piston chamber 94 to engage the clutch.

When the clutch is engaged it can be disengaged by reducing the speed of the driving member below that of the intermediate member so that the torque ring 84 moves toward the right to open the opening 127 in the valve member 125, as shown in Fig. 1. Alternatively, the clutch can be disengaged by merely closing the valve 152, but in this case clutch disengagement may be somewhat delayed as there must be leakage of the oil trapped in the piston chamber 94. Some leakage takes place through the oil hole 121 for the bearings 24 and 26.

*Oil level sensing device*

A stationary or nonrotatable scoop tube 162 is carried by the oil transfer member 50 and extends generally radially therefrom. As shown, the tube 162 extends downwardly but this is not essential. The scoop tube 162 is or may be similar to the scoop tube 104 but it is preferably considerably shorter. The tube 162 at its outer or lower end preferably has an intake opening 164 which faces in the direction to pick up oil from the moving annular layer of oil in the reservoir.

As shown, the inner or upper end of the tube 162 communicates with a longitudinal hole 166 in the member 50, the inner or left end of said hole being plugged at 167. The hole 166 at its outer or right end communicates with a nipple 168 to which is connected a pipe 170 extending to a suitable indicator such as a pressure gage 172, which is shown only schematically. The gage 172 indicates the oil pressure in the scoop tube 162.

As the result of its velocity, oil impinging upon the tube 162 has a considerable impact pressure which is additional to the pressure due merely to centrifugal action. The total pressure in the tube is the combination of the said impact pressure and the said centrifugal pressure.

In view of the foregoing, it will be apparent that, for any given clutch speed, the pressure component due to impact remains constant but the pressure component due to centrifugal action varies directly in accordance with the amount of oil in the reservoir. Therefore, by noting the total pressure as shown by the gage 172, the quantity of oil in the reservoir can be determined and the pilot of the helicopter can readily determine whether he has a safe quantity of oil.

Preferably and as shown, the tube 162 is considerably shorter than the tube 104, the position of the outer end of said tube 162 being so selected that it will dip into the minimum annular layer of oil that is consistent with safety. If and when the annular layer of oil is depleted to such an extent that the tube 162 no longer enters it, the gage 172 will have a zero reading and the pilot will know that the quantity of oil in the reservoir is dangerously small.

*Filling means*

Oil may be supplied to the reservoir within the housing from time to time through the pipe 174 shown in Figs. 4 and 6. The pipe 174 is connected with a nipple 176 carried by the oil transfer member 50. A longitudinal hole 178 in the said member communicates at its right end with the nipple 176 and at its left end with the interior of the housing. It will be evident that oil flowing through the pipe 174 will pass through the hole 178 and directly into the reservoir within the housing. The quantity of oil required to be introduced can be determined by observing the gage 172.

It will be seen that the oil transfer member 50 has four holes therein for four different purposes, all as previously described. For convenience, the hole 146 is designated as the "first" hole, the hole 178 is designated as the "second" hole, the hole 166 is designated as the "third" hole and the hole 161 is designated as the "fourth" hole.

*Supporting means for scoop or intake tubes*

The scoop or intake tubes 104 and 162 have heretofore been described as carried by the oil transfer member 50. Inasmuch as the outer portions of these tubes are entered in the rapidly rotating layer of oil, said tubes must be firmly supported. The presently preferred supporting means will be described, reference being had particularly to the supporting means for the tube 162. The supporting means for the tube 104 is similar and no separate description is required.

Referring particularly to Figs. 4 and 7, it will be observed that there are two metal plates 180, 180 which are connected with the intake tube 162 at opposite sides thereof by brazing or otherwise. At their radially inward edges the plates 180, 180 are connected by brazing or otherwise with an arcuate strip 182 which is apertured so that the inner end of the tube 162 extends through it. At their opposite lateral edges the said plates 180, 180 are connected by brazing or otherwise with two attachment tubes 184, 184. The attachment tubes are preferably parallel and the inner ends of the said tubes are shaped to engage and be connected with the arcuate strip 182. Screws 186 extend through and fit the tubes 186, 186, the inner ends of the screws being entered in threaded holes in the oil transfer member 50 and the screws thus serving to attach the intake tube to the oil transfer member.

From the foregoing description it will be seen that each scoop or intake tube with its supporting means constitutes a distinct unit which can be separately assembled and which can be attached to the member 50 by means of the said screws 186, 186.

*General summary of operation*

When a clutch mechanism embodying the present invention is used as a part of a helicopter, it constitutes a portion of the power connection from the motor to the rotor or rotors. With the valve 152 closed, the motor is operatively disconnected from the rotor or rotors and the motor can be operated at idling speed or at any other speed desirable for warm-up purposes or otherwise. The torque ring 84 may be moved toward the left to close the valve opening 127, but no oil can enter the piston chamber 94 and the clutch therefore remains disengaged.

When the rotor or rotors are to be connected with the engine, the motor is operated at idling speed and the valve 152 is opened. At idling speed oil pressure is transmitted from the scoop tube 104 to the piston chamber 94, but this pressure is not sufficient to engage the clutch and the rotor or rotors are not rotated. For starting the rotor or rotors the clutch can be engaged by gradually increasing the motor speed and therefore the speed of the intermediate member of the clutch mechanism. As the speed increases, the oil pressure increases and the clutch is engaged slowly and without any sudden shock or grabbing. With the clutch fully engaged the rotor or rotors can be rotated at any speed within a normal range.

The clutch mechanism automatically provides for autorotation whenever the speed of the motor and of the driving member 10 are reduced below the speed of the intermediate member which is connected with the rotor or rotors. When the intermediate member rotates or tends to rotate faster than the driving member, the torque ring 84 is moved toward the right to open the valve opening 127, thus releasing the pressure in the piston chamber 94 and permitting the clutch to be disengaged. With the clutch disengaged the intermediate member is no longer connected with the rotor or rotors and it is free to move in unison with the driving member 10. Power-on flight can be resumed at any time by increasing the speed of the motor and of the driving member so that the driving member tends to rotate faster than the intermediate member. Thereupon the torque ring is moved toward the left to close the valve opening 127 and to thereby cause re-engagement of the clutch.

The invention claimed is:

1. In a clutch mechanism for a helicopter, the combination of a driving member and a normally driven member and an intermediate member all rotatable about the same axis, the said intermediate member including a housing provided with a main annular oil reservoir within which an annular layer of oil may be rotated, a friction clutch on the intermediate member serving upon the application of pressure to said clutch to transmit power from said intermediate to said normally driven member, rotary means on the intermediate member including a piston chamber having a discharge outlet and also including a relatively movable piston in said chamber for applying pressure to engage the clutch, a stationary generally radial oil intake tube within the housing having an intake opening at its outer end positioned to enter said annular layer of oil so as to receive oil under pressure therefrom, a series of intercommunicating pressure retaining ducts which are normally unobstructed and which extend continuously from the inner end of said intake tube to said rotary piston chamber so that oil may flow continuously and without interruption from said tube to said chamber, said ducts including an unobstructed generally radial rotary duct having its outer end in communication with the piston chamber separately from said discharge outlet and having its inner end at approximately the same radius as the inner end of the intake tube so that the centrifugal action of the oil in said unobstructed generally radial duct tends to increase the net oil pressure in the piston chamber above the intake tube pressure, a rotary closure for said discharge outlet having a closed position for causing oil pressure to be maintained within the piston chamber so that the clutch is engaged and having an open position for preventing oil pressure within the piston chamber so that the clutch is released, and means for transmitting power between the driving member and the intermediate member, the last said means including a device for moving said closure to its closed position when power is transmitted from the driving member to the intermediate member and for enabling said closure to move to its open position when power is transmitted from the intermediate member to the driving member.

2. In a clutch mechanism for a helicopter, the combination of a driving member and a normally driven member and an intermediate member all rotatable about the same axis, the said intermediate member including a housing provided with a main annular oil reservoir within which an annular layer of oil may be rotated, a friction clutch serving upon the application of pressure thereto to transmit power from said intermediate to said normally driven member, rotary means on the intermediate member including a piston chamber having a discharge outlet and including a relatively movable piston in said chamber for applying pressure to engage the clutch, means separate from said discharge outlet for supporting oil under pressure from said oil reservoir to said piston chamber, means for transmitting power between the driving member and the intermediate member which last said means includes, a ring between the driving member and intermediate member said ring being longitudinally movable in a first direction toward the discharge outlet for the piston chamber when power is transmitted from the driving member to the intermediate member and said ring being longitudinally movable in a second direction away from said discharge outlet when power is transmitted from the intermediate member to the driving member, and a closure carried by and positively connected with said ring for movement in unison therewith in both directions, said closure being positioned to close the discharge outlet when the ring is moved in said first direction and to open said discharge outlet when said ring is moved in said second direction.

3. A clutch mechanism as set forth in claim 2, wherein the intermediate member has a longitudinal opening communicating with the piston chamber and extending toward said ring, wherein a valve member is longitudinally movable in said opening and is spring biased toward said ring which valve member has said discharge outlet extending therethrough, and wherein the closure engages said valve member to close the discharge outlet therein and to move it in opposition to said spring when the ring is moved in said first direction, said closure being disengaged from said valve member to open said discharge outlet therein when the ring is moved in said second direction.

4. In a clutch mechanism for a helicopter, the combination of a driving member and a normally driven member and an intermediate member all rotatable about the same axis, the said intermediate member including a housing provided with a main annular oil reservoir within which an annular layer of oil may be rotated, a friction clutch serving upon the application of pressure thereto to transmit power from said intermediate to said normally driven member, rotary hydraulic means on the intermediate member having an oil discharge outlet which means serves for applying pressure to engage the clutch, means for supplying oil under pressure from said oil reservoir to said hydraulic means, means for transmitting power between the driving member and the intermediate member which last said means includes a ring between the driving member and intermediate member, said ring being longitudinally movable in a first direction to close said discharge outlet when power is transmitted from the driving member to the intermediate member and said ring being longitudinally movable in a second opposite direction when power is transmitted from the intermediate member to the driving member, a closure carried by and positively connected with said ring for movement in unison therewith, said closure being positioned to close the discharge outlet when the ring is moved in said first direction and to open said discharge outlet when said ring is moved in said second direction, and a plurality of shock absorbing bumpers positioned on the intermediate member for engaging the ring to minimize shock when the ring is moved in said first direction.

5. In a clutch mechanism for a helicopter, the combination of a driving member and a normally driven member and an intermediate member all rotatable about the same axis, the said intermediate member including a housing provided with a main annular oil reservoir within which an annular layer of oil may be rotated, means for transmitting power from the driving member to the intermediate member, a friction clutch serving upon the application of pressure thereto to transmit power from said intermediate to said normally driven member, rotary hydraulic means on the intermediate member for applying pressure to engage the clutch, a first stationary oil intake tube located within the housing and having an outer intake opening positioned to enter said annular layer of oil so as to receive oil under pressure therefrom, a series of intercommunicating ducts extending from said first stationary intake tube to said rotary hydraulic means, a second stationary oil intake tube located within the housing and having an outer intake opening positioned to enter said annular layer of oil so as to receive oil under pressure therefrom, said second tube being free from any connection with said series of ducts, and an indicator connected with said second tube independently of said first tube and independently of said series of ducts for indicating the pressure of the oil in said second tube and for thus indicating the quantity of oil in said reservoir.

6. A clutch mechanism as set forth in claim 5, wherein the second tube has its intake opening at a substantially smaller radius than that of the intake opening of the first tube.

7. In a clutch mechanism for a helicopter, the combination of a driving member and a normally driven member and an intermediate member all rotatable about the same axis, the said intermediate member including a housing provided with a main annular oil reservoir within which an annular layer of oil may be rotated, means for transmitting power from the driving member to the intermediate member, a friction clutch serving upon the application of pressure thereto to transmit power from said intermediate to said normally driven member, rotary hydraulic means on the intermediate member for applying pressure to engage the clutch, a nonrotary oil transfer member located partly within the housing of the intermediate member which member has two holes therein constituting two separate ducts, a first stationary oil intake tube carried by said oil transfer member and located within the housing and having an outer intake opening positioned to enter said annular layer of oil so as to receive oil under pressure therefrom, the inner end of said tube communicating with one of said ducts in said oil transfer member, a series of intercommunicating ducts extending from the last said duct to said rotary hydraulic means, a second stationary oil intake tube carried by said oil transfer member and located within the housing and having an outer intake opening positioned to enter said annular layer of oil so as to receive oil under pressure therefrom, said second tube being free from any connection with said series of ducts and the inner end of said second tube communicating with the other of said ducts in said oil transfer member, and an indicator connected with the last said duct independently of said series of ducts for indicating the pressure of the oil in said second tube and for thus indicating the quantity of oil in said reservoir.

8. In a clutch mechanism for a helicopter, the combination of a driving member and a normally driven member and an intermediate member all rotatable about the same axis, the said intermediate member including a housing provided with a main annular oil reservoir within which an annular layer of oil may be rotated, an annular friction clutch serving upon the application of pressure thereto to transmit power from said intermediate to said normally driven member, rotary hydraulic means on the intermediate member for applying pressure to engage the clutch, a nonrotary annular oil transfer member surrounding the driving member and located partly within the housing of the intermediate member, said oil transfer member having two separate generally longitudinal holes therein spaced from the driving member and from each other and constituting first and second ducts which first duct is adapted to retain pressure and which second duct communicates with the interior of the housing, a stationary oil intake tube carried by said oil transfer member and located within the housing and having an outer intake opening positioned to enter said annular layer of oil so as to receive oil under pressure therefrom, the inner end of said tube communicating with the inner portion of said first duct in said oil transfer member, a series of intercommunicating pressure retaining ducts extending from the said first duct to said rotary hydraulic means, and a pipe at the exterior of said housing communicating with said second duct in said oil transfer member and serving to supply oil to the interior of the housing.

9. In a clutch mechanism for a helicopter, the combination of a driving member and a normally driven member and an intermediate member all rotatable about the same axis, the said intermediate member including a housing provided with a main annular oil reservoir within which an annular layer of oil may be rotated, means for transmitting power from the driving member to the intermediate member, an annular friction clutch serving upon the application of pressure thereto to transmit power from said intermediate to said normally driven member, rotary hydraulic means on the intermediate member for applying pressure to engage the clutch, a nonrotary oil transfer member surrounding the driving member and located partly within the housing of the intermediate member, said oil transfer member having three separate holes therein spaced from the driving member and from each other and constituting first and second and third ducts which first and third ducts are adapted to retain pressure and which second duct communicates with the interior of the housing, a first stationary oil intake tube carried by said oil transfer member and located within the housing and having an outer intake opening positioned to enter said annular layer of oil so as to receive oil under pressure therefrom, the inner end of said tube communicating with said first duct in said oil transfer member, a series of intercommunicating pressure retaining ducts extending from the said first duct to said rotary hydraulic means, a pipe at the exterior of the housing communicating with said second duct in said oil transfer member and serving to supply oil to the interior of the housing, a second stationary oil intake tube carried by said oil transfer member and located within the housing and having an outer intake opening positioned to enter said annular layer of oil so as to receive oil under pressure therefrom, the inner end of said second tube communicating with the third duct in said oil transfer member, and an indicator connected with said third duct for indicating the pressure of the oil in said second tube and for thus indicating the quantity of oil in said reservoir.

10. A clutch mechanism as set forth in claim 9, wherein the oil transfer member has a fourth duct therein which is adapted to retain pressure and which communicates with said communicating ducts extending from said first duct in the transfer member to the rotary hydraulic means, and wherein an indicator is connected with said fourth duct in said oil transfer member at the exterior of the housing for indicating the pressure of the oil in said communicating ducts.

References Cited in the file of this patent

UNITED STATES PATENTS

| | | |
|---|---|---|
| 1,441,589 | Krough | Jan. 9, 1923 |
| 1,722,289 | Gurley | July 30, 1929 |
| 2,210,416 | Kiep et al. | Aug. 6, 1940 |
| 2,440,624 | Wemp | Apr. 27, 1948 |
| 2,517,955 | Zimmermann | Aug. 8, 1950 |
| 2,586,220 | Gerst | Feb. 19, 1952 |
| 2,587,823 | De Pew | Mar. 4, 1952 |
| 2,646,150 | Hobbs | July 21, 1953 |
| 2,664,176 | Whalen | Dec. 29, 1953 |
| 2,715,455 | Miller | Aug. 16, 1955 |

FOREIGN PATENTS

| | | |
|---|---|---|
| 707,664 | Great Britain | Apr. 21, 1954 |